United States Patent [19]

Joy

[11] Patent Number: 4,807,545
[45] Date of Patent: Feb. 28, 1989

[54] TECHNIQUE FOR LOOSENING, AERATING AND FERTILIZING SOIL PLANT ROOTS

[75] Inventor: Stanley E. Joy, Arvada, Colo.
[73] Assignee: Grow Gun Corporation, Arvada, Colo.
[21] Appl. No.: 78,031
[22] Filed: Jul. 27, 1987

Related U.S. Application Data

[63] Continuation-in-part of Ser. No. 780,973, Sep. 27, 1985, Pat. No. 4,682,550.

[51] Int. Cl.⁴ ............................................. A01C 15/02
[52] U.S. Cl. ........................................................ 111/7.1
[58] Field of Search .................... 111/7.1, 7.2, 7.4, 6; 47/48.5

[56] References Cited

U.S. PATENT DOCUMENTS

| | | | |
|---|---|---|---|
| 1,422,831 | 7/1922 | Camp . | |
| 1,755,445 | 4/1930 | Irish | 111/7.1 |
| 1,814,445 | 7/1931 | Irish | 111/7.1 |
| 2,065,678 | 12/1936 | Fish | 111/7.1 |
| 2,083,153 | 6/1937 | Irish | 47/49 |
| 2,323,773 | 7/1943 | Irish | 47/48 |
| 2,857,864 | 10/1958 | Cromer | 111/95 |
| 2,906,056 | 9/1959 | Youngblood | 111/7.1 |
| 3,026,827 | 3/1962 | Cunningham | 111/7.1 |
| 3,040,680 | 6/1962 | McCluskey | 111/7.4 |
| 3,142,273 | 7/1964 | Dilts | 111/7.1 |
| 3,900,962 | 8/1975 | Chan | 47/48 |
| 3,916,564 | 11/1975 | Crowell, Sr. | 47/48.5 |
| 4,156,396 | 5/1979 | Konucik | 111/7.1 |
| 4,429,647 | 2/1984 | Zinck | 111/6 |
| 4,432,291 | 2/1984 | Shirley | 111/7.1 |

FOREIGN PATENT DOCUMENTS 798638 11/1968 Canada ................................. 111/9

Primary Examiner—Richard J. Johnson
Attorney, Agent, or Firm—Cahill, Sutton & Thomas

[57] ABSTRACT

A hand-held apparatus is connected by means of an air hose to a high pressure compressor and air tank unit, and is connected by means of a hose to a conventional water faucet. The device includes a bin for storing granular fertilizer and an air valve connecting the high pressure air supply into a rigid outer tube that is inserted into a pre-drilled hole in the ground. An operator stands on a horizontal ground plate attached to the outer tube to seal the hole, and opens the air valve to force high pressure air into the pre-drilled hole. The compressed air rapidly lifts up the apparatus and the operator standing thereon. As the compressed air then escapes, the apparatus and person standing on the ground plate falls back to reseal the hole, producing an effective repetitive hammering action that causes the compressed air to more effectively loosen the soil, creating many small crevices in the soil around the roots of a plant. The fertilizer in the bin then is released into the outer tube. The high pressure air valve is re-opened. The high pressure air forces the granular fertilizer out of the bottom of the outer tube and into the previously created crevices. Pressurized water then is conducted through a water valve to an inner tube concentric with the outer tube, forcing the water into the crevices, dissolving the fertilizer, moisturizing the soil and roots, and sealing the crevices by causing the moistened soil to collapse.

4 Claims, 2 Drawing Sheets

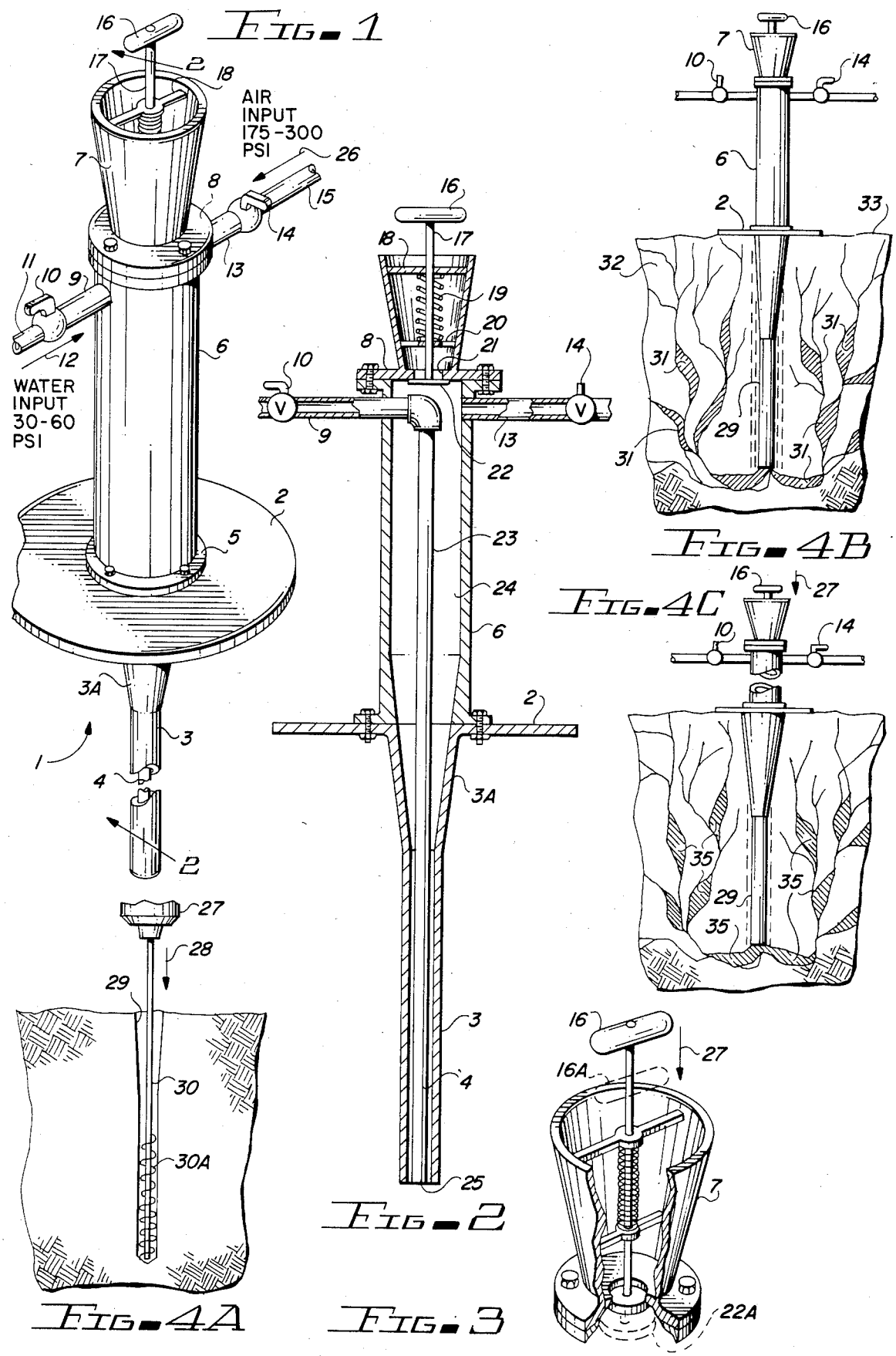

TECHNIQUE FOR LOOSENING, AERATING AND FERTILIZING SOIL PLANT ROOTS

CROSS-REFERENCE TO RELATED APPLICATION

This applications is a continuation-in-part of allowed patent application Ser. No. 780,973, filed Sept. 27, 1985, entitled "HAND-HELD APPARATUS AND METHOD FOR LOOSENING, AERATING AND FERTILIZING SOIL PLANT ROOTS", which will issue as U.S. Pat. No. 4,682,550 on July 28, 1987, incorporated herein by reference.

BACKGROUND OF THE INVENTION

The invention relates to a technique for using a hand-held device for forcing high pressure air into the ground around plant roots, loosening the soil and producing crevices therein, forcing granular fertilizer, pesticides, chemicals or the like into the crevices, and using the same device to force water into the crevices to dissolve the fertilizer or chemicals.

It is known that forcing substantial quantities of compressed air into the ground around the roots of trees and large shrubs can be beneficial, by loosening the soil, allowing escape of toxic materials that may be in the soil, and especially by facilitating injection of beneficial materials such as fertilizers and chemicals close to the plant roots. The same benefits have been recognized for broad scale application in commercial agricultural applications. U.S. Pat. No. 2,083,153 is perhaps the closest prior art. This device discloses an apparatus for injecting pressurized air into a pre-drilled hole to produce fissures in the deep soil. Soil-rectifying agents such as fertilizer and insecticide can be forced through the same tube through which the air passes into the fissures of the loosened soil. U.S. Pat. No. 4,429,647 discloses an apparatus connected to a high pressure air source and to a liquid fertilizer tank, for use in commercial agriculture. A system is described wherein a number of probes mounted on a tractor are forced by hydraulic means to a certain depth in the ground, wherein high pressure air then is forced through the probe in the soil, causing breaking up of the soil. Liquid fertilizer then is forced into the voids and cracks produced in the soil by the compressed air. The device described in U.S. Pat. No. 4,429,647 is not practical for use in private and commercial horticultural applications, as substantial force must be applied by a large machine to force the probes into the ground and to hold the probes in the ground when the high pressure air is applied. Small, hand-held devices that can be fit into small spaces and rapidly and easily deployed would be required for such private and commercial horticultural applications. Several hand-held devices for aerating soil around the roots of trees and shrubs are disclosed in U.S. Pat. Nos. 1,814,445 and 1,755,445. The latter patent discloses use of compressed air forced through a tube into the ground to first open up crevices around the roots by means of compressed air, and then diverts the compressed air into a fertilizer tank, forcing the fertilizer through the same tube into the ground to fill up the crevices. No such device has been widely used, however, probably because of the difficulty that an ordinary worker would experience in using it. If enough air pressure is applied to be effective in breaking up tightly packed, hardened soil around the roots of trees and shrubs, it would be difficult for most workers to keep the device in the ground and prevent most of the compressed air from flowing out in the atmosphere through the top of the hole into which the device is inserted, rather than being forced into the ground at the bottom of the hole and thereby loosening the soil.

A variety of devices that are insertable into the ground for providing controlled irrigation of plant roots and injection of chemicals and fertilizer are known, as indicated in U.S. Pat. Nos. 4,432,291, 3,916,564, and 3,900,962.

Despite the fairly widespread recognition that there can be advantages to using compressed air to loosen dirt around the roots of trees and shrubs, and that there can be advantages of conducting fertilizing and water through inserted tubes to locations fairly deep in the ground near the roots of plants, no one has yet provided an inexpensive, effective, hand-held device that can easily, economically, and rapidly improve the growth and appearance of trees and shrubs. There remains an unmet need for such a device.

SUMMARY OF THE INVENTION

Accordingly, it is an object of the invention to provide an economical, hand-held device that can be operated easily by one person, and is capable of more effectively breaking up soil around the roots of trees and plants with compressed air than any prior device, injecting fertilizer into the loosened soil, and injecting water therein to rapidly dissolve the fertilizer and seal the crevices, all in a single operation.

Briefly described, and in accordance with one embodiment thereof, the invention provides a hand-held apparatus including an air hose for connection to a portable high pressure air source, a water hose for connection to an ordinary water supply, air and water valves for selectively connecting an outer tube of the apparatus inserted into a pre-drilled hole in the ground in the vicinity of plant roots and an inner concentric tube, respectively, a flat ground plate on which an operator stands to seal the mouth of the pre-drilled hole and prevent the high pressure air from effectively forcing the device out of the pre-drilled hole, the apparatus including a fertilizer bin and valve by means of which the high pressure air forces granular fertilizer into the crevices created by loosening of the soil, wherein the water valve is actuated to inject water into the crevices, dissolving the fertilizer therein, moistening the soil, and causing collapse and sealing of the crevices. In the described method of using the operation, the compressed air rapidly lifts up the device and the person standing on the ground plate thereof. As compressed air escapes from the temporarily unsealed hole, the device with operator standing thereon fall so that the ground plate reseals the hole. This operation repetitively occurs, and the result is an effective, repetitive surging or "hammering" action that causes the compressed air to effectively loosen tightly packed soil.

BRIEF DESCRIPTION OF THE DRAWINGS

FIG. 1 is a partial perspective view illustrating the device of the present invention.

FIG. 2 is a section view along section line 2—2 of FIG. 1.

FIG. 3 is a partial cutaway perspective view useful in illustrating certain features of the fertilizer bin of the device of FIG. 1.

FIGS. 4A–4E are section views that are useful in explaining the operation of the device of FIG. 1.

DESCRIPTION OF THE INVENTION

Figure 4D:
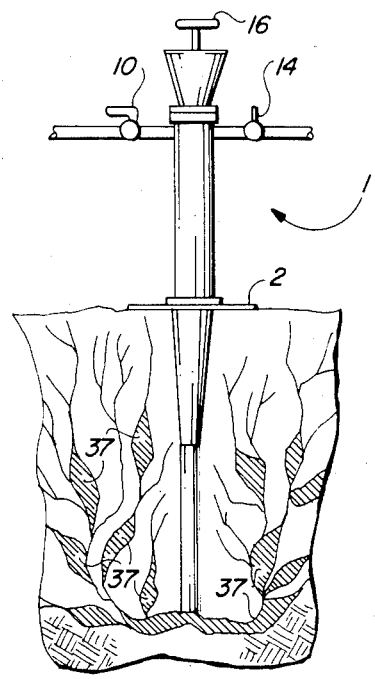
Figure 4E:
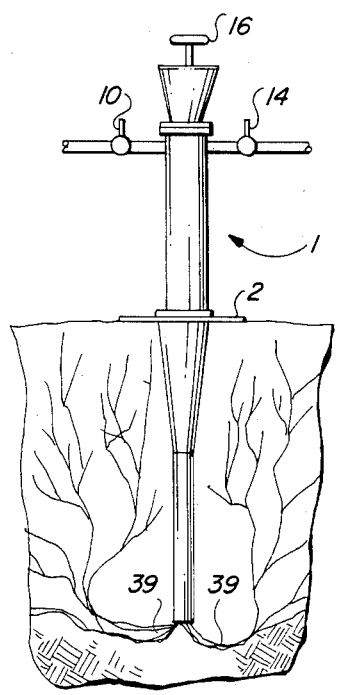

Referring now to the drawings, especially FIG. 1, hand-held root treatment apparatus 1 includes a round, annular ground plate or collar 2 that is approximately 15 inches in diameter and 5/16 of an inch thick. An outer tube 3 has an outside diameter of about two inches. The upper end of tube 3 is threaded, as indicated by reference numeral 45, and is screwed into a mating threaded hole in ground plate 2. The threaded hole in ground plate 2 extends into the tapered lower portion 6A of housing 6 of chamber 24. The length of tube 3, measured from the bottom of ground plate 2 to the bottom end 25 is approximately 20 inches in the described embodiment of the invention.

An inner tube 4 extends concentrically through outer tube 3. The outside diameter of inner tube 4 is about five-eighths of an inch. The inside diameter of outer tube 3 is about one and three-quarters inches. The bore through inner tube 4 is approximately one-half of an inch in diameter.

Upper chamber 24 is bounded by a cylindrical housing 6, the bottom of which is clamped in a sealed manner by means of a flange 5 and suitable bolts to the upper surface of ground plate 2. Chamber 24 has a diameter of about six inches. The thickness of the wall of cylindrical housing 6 is about one-fourth of an inch, except for the lower portion 6A, where the inner diameter tapers down to match the inside diameter of outer tube 3. The height of cylindrical chamber 6 is about 20 inches. Chamber 24 is in open communication with the space between outer tube 3 and inner tube 4. A petcock or relief valve 44 is connected to the upper portion of chamber 24 and allows pressure in chamber 24 and tube 3 to be conveniently released by opening the valve 44, if necessary.

At the top of cylindrical chamber 6, a reservoir 7 is attached by a flange 8 in sealed relationship with a flange that is integral with the top of cylindrical cylinder 6. The top of reservoir 7 is covered by a thin, clear plexiglass disk, designated by reference numeral 42, approximately one-fourth of an inch thick. A clearance hole 43 is disposed in the center of plexiglass cover disk 42. Disk or cover 42 can be lifted to allow granular fertilizer, pesticide or other appropriate chemicals to be poured into reservoir 7. An opening 21 in the bottom of reservoir 7 normally is closed by means of a valve plate or trap door 22 that is attached to the lower end of a vertical plunger or rod 17. Rod 17 is supported in and extends two bushings in support arms 18 and 20 that are rigidly attached to the inside wall of reservoir 7. Rod 17 also extends through above-mentioned clearance hole 43 of cover disk 42. The walls of reservoir 7 are sloped outward to ensure that when trap door 22 is opened by depressing handle 16, all of the granular contents in reservoir 7 will easily fall downward through opening 20 into chamber 24.

The bottom portion of the inner wall of chamber 24 is tapered inwardly to mate with the bore of tube 3.

A compression spring 19 is disposed between bushing support arms 18 and 20, and is attached to rod 17 to urge rod 17 to its uppermost position, thereby urging valve plate 22 upward against the bottom of reservoir 17 around the mouth of hole 21. A suitable resilient washer can be provided around the periphery of plate 22 and/or the material surrounding the bottom of opening 21 to produce a high pressure seal that prevents air from escaping upward through hole 21 into reservoir 17 when high pressure air is forced into chamber 24, as next described. When high pressure air is forced into chamber 24, the upward pressure on the bottom of trap door 22 aids spring 19, improving the sealing of trap door 22 to the bottom of reservoir 7.

In the event that tube 3 becomes clogged or high pressure air otherwise is trapped in chamber 24, the opening of relief valve 44 allows the high pressure air to escape without opening trap door 22, which is forced closed by the trapped air pressure.

A horizontal air inlet pipe 13 is rigidly attached to the upper end of cylindrical housing 6, and opens into chamber 24. An air valve 14 is attached in open communication with air inlet pipe 13 and a flexible high pressure air hose 15. Air hose 15 is connected to a portable air compressor/pressure tank unit that stores a suitable supply of air at a pressure of about 170 to 300 pounds per square inch, although even higher air pressure, such as 400 pounds per square inch or more could be used. Thus, when air valve 14 is opened, high pressure air in the storage tank is forced into chamber 24, through the space between outer tube 3 and inner tube 4 and out of the open bottom end 25 of the root treatment device 1.

A water tube 9 is rigidly attached to the exterior of cylindrical housing 6, in diametrically opposed relationship to air inlet tube 13. Water inlet tube 9 passes through the wall of housing 6 and is connected by means of an elbow to the upper end of inner tube 4. A water valve 10 is connected in open communication with the outer end of water inlet tube 9 and a hose, the other end of which is connected to an ordinary water faucet from which water having a pressure of 30 to 60 pounds per square inch is supplied.

Water inlet pipe 9 and air inlet pipe 13 are sufficiently rigidly attached to the upper end of cylindrical housing 6 that they effectively serve as handles by means of which an operator can control the root treatment apparatus 1.

FIG. 3 illustrates the use of reservoir or hopper 7 in more detail. Plexiglass cover 42 is lifted upward, so that fertilizer or chemicals can be poured into reservoir 7. When reservoir 7 is filled with granular fertilizer or other treatment chemicals, and the operator desires to dump the fertilizer or chemicals in reservoir 7 into chamber 24, the operator simply pushes handle 16 downward in the direction of arrow 27 in FIG. 3 to the position indicated by dotted lines 16A. This causes valve plate 22 to be lowered to the position indicated by dotted line 22A, thereby opening passage 21, so that the fertilizer or chemicals can be forced by high pressure air out of the lower end of root treatment apparatus 1. Should any pressurized air still be present in chamber 24 and any granular fertilizer or chemicals still be present in reservoir 7, plexiglass cover 42 prevents such granular fertilizer or other chemicals from being blown upward into the face of the operator.

The method of using and operating the root treatment apparatus 1 in accordance with the present invention is described with reference to FIGS. 4A–4E.

Referring first to FIG. 4A, a pneumatic drill 27 is used to pre-drill a number of holes such as 29 in the soil around the roots of a tree or shrub. The holes preferably are about 2 inches in diameter, and can be 36 or more inches deep. When the tube 3 is inserted into the pre-drilled hole 29, it fits fairly tightly. The pneumatic drill 27 is forced into the ground as indicated by arrow 28, so that its drilling element 30A, supported by shank 30, produces the desired hole. Pneumatic drill 27 then is removed.

Next, the root treatment apparatus 1 is lowered into the pre-drilled hole 29. Since the outer tube is 20 inches long, the bottom 25 of tube 3 will be positioned about six inches from the bottom of the 26 inch pre-drilled hole 29, when ground plate 2 rests on the surface 33 of the ground 32.

The operator then stands on the top of ground plate 2, one foot on either side of cylindrical housing 6. The operator grasps the "handles" consisting of water inlet pipe 9 and air inlet pipe 13, and opens the air valve 14, so that pressurized air is forced out of the bottom 25 of tube 3 into the bottom of pre-drilled hole 29. Water valve 10 is off. The air pressure is sufficiently high that a large number of small cracks and crevices such as 31 surrounding pre-drilled hole 29 may be formed, loosening and aerating the soil. The weight of the operator standing on ground plate 2 seals the pre-drilled hole.

The air pressure is sufficiently great that if the deep soil 32 is tightly packed, the air pressure will lift both the operator and the root treatment apparatus 1 upward a few inches, allowing some of the compressed air to escape from the hole. The upward momentum or "overshooting" of the root treatment device 1 with the operator thereon then will be reversed due to the force of gravity, causing the root treatment apparatus 1 and operator standing thereof to "fall" back so that the bottom surface of ground plate 2 reseals the pre-drilled hole 29, and the compressed air pressure again builds up inside the hole and again lifts up the root treatment apparatus and the operator. This operation occurs in a repetitive manner, as indicated by arrows 47 in FIG. 4B, producing a "hammering" or surging effect that substantially aids the breaking up and loosening of the soil 32 and the formation of crevices 31 therein even in very hardened soil.

Next, referring to FIG. 4C, and assuming that the operator has previously poured fertilizer into reservoir 7, the operator turns off air valve 14, momentarily opens relief valve 44 to release any pressure in chamber 24, and momentarily presses handle 16 downward as indicated by arrow 27, causing the fertilizer to fall into the chamber 24. The operator then re-opens air valve 14. The re-opening of air valve 14 causes the 175 to 300 psi air to be forced into chamber 24, thereby forcing the fertilizer downward through tube 3 and into the crevices or voids 31 previously produced in the loosened soil, as indicated in FIG. 4B.

The next step in the procedure is described with reference to FIG. 4D. The operator, still standing on ground plate 2, turns off air valve 14 and opens water valve 10. This causes 30 to 60 psi (pounds per square inch) of water to flow in the direction of arrow 12 (FIG. 1) through inner tube 4, out of the bottom 25 of the root treatment device 1, and into the previously created voids and crevices that are now filled with fertilizer, as indicated by 35 in FIG. 4C. The water forced into the crevices is indicated by reference numerals 37 in FIG. 4D, and rapidly soaks the fertilizer and the loosened soil, thereby moisturizing the soil around the roots of the tree or shrub and almost immediately bringing high nutrient solution in contact with the roots so it may benefit the tree or shrub.

It should be noted that the initial loosening of the soil by the injected high pressure air, as previously described, usually results in breaking a large number of tiny roots of the plant where the various voids and crevices are formed. At such locations, the plant almost immediately begins growing tiny new rootlets in the vicinity of the voids into which fertilizer and moisture has been injected. This results in the above-mentioned immediate supplying of high nutrient material to the plant and resulting in the major improvement of the growth and health of the plant.

The last step in the operation is to turn water valve 10 off, relieving all pressure in the previously created voids. Ordinarily, by this time enough soaking will have occurred that the crevices and voids become sealed, or the soil around them collapses, as indicated by reference numerals 39 in FIG. 4E.

The amount of time required for each of the above steps may vary. Initially, the high pressure air may be applied to initially create the crevices 29 of FIG. 4B for about 15 seconds to 30 seconds. Once this step is complete and the fertilizer has been dumped from reservoir 7 into chamber 24, the high pressure air needs to be applied for approximately 20 seconds to adequately force the granular fertilizer into the previously created crevices to produce the condition indicated by reference numerals 35 in FIG. 4C. It may be necessary to repeat the 15 to 30 second applications of the compressed air five to ten times at 15 to 30 second intervals to achieve the desired loosening of the soil in some cases. Finally, the high pressure water is applied to insert typically 15 to 20 gallons into the loosened soil and fertilizer therein. Then compressed air can be applied again to force water further into the crevices, to produce the condition illustrated in FIG. 4D. Finally, the condition shown in FIG. 4E can be expected about 15 seconds to 20 seconds after the water has been forced into the crevices by the air.

I have found that use of the root treatment apparatus 1 in the above-described manner results in more effective, rapid treatment of trees and large shrubs with more notable and rapid results than any other fertilizing and-/or chemical treatment technique of which I am aware.

The described device thus provides a hand-held root treatment device that can be operated by one operator. In a single operation, soil around the roots of a plant can be loosened, treated with fertilizer or other beneficial chemical substance, and moistened in such a manner as to have the most benefit to the plants in the shortest amount of time, without the use of bulky, expensive, or complex equipment as required by some prior art devices and without the requirement of using separate tools and performing separate operations with the separate tools required by other prior art devices.

Recent testing of the prototype described in the abovereferenced parent application led to the discovery that the taper 3A of the upper portion of outer tube 3 is not necessary to obtain a good seal at the mouth of the hole. The weight of the operator standing on the ground plate 2 is adequate. Providing uniform diameter for the tube 3 substantially reduces the cost of manufacture, so the taper 3A has been eliminated in the present embodiment of the invention. However, in the event that a good seal is not achievable between the bottom surface of ground plate 2 and the soil surrounding the hole, a removable tapered plastic sleeve can be slid upward over outer tube 3 to provide the taper 3A shown in the parent application. The amount of taper can be selected as desired to provide the necessary seal of the hole. Other recent experiments have shown that it would be very beneficial to utilize lengths of tube 3 that are up to three feet in length because deeper penetration can help loosen hard pan layers that prevent water from percolating away from the root zones of trees and thereby prevents a build-up of salt concentration around the roots which damages the roots.

The provision of threads 45 on the upper end 3A of tube 3 allows different length sections of outer tube 3, corresponding to different depth holes, to be utilized. In some instances, presence of rocks or other difficult drilling conditions may make it impossible to drill hole 29 to the desired depth, in which case a shorter outer tube 3 is required. In other instances, depths of roots of particular plants or other conditions may necessitate drilling of exceptionally deep holes, in which case it may be desirable for the length of tube 3 to be longer. The length of the inner water tube 4 preferably is selected to match the shortest outer tube 3 that would be used. Alternately, if it is desired that the lower end of inner tube 4 always be near the lower end of whichever length of outer tube 3 is being used, a threaded coupling can be provided in the lower portion of chamber 24 so that various interchangeable sections of the lower portion of inner tube 4 can be interchanged along with the different sections of outer tube 3.

The described device has the advantages that it is light in weight, as it weights only about 45 pounds, and could be made even lighter by use of lighter materials and by use of a more optimized design. The device can be used easily by one operator, can be easily fit into tight spaces, and does not require any expensive auxiliary equipment either for supporting it or for supplying it with pressurized water and air as air compressors that will work very satisfactorily are readily available at low cost.

While the invention has been described with reference to a particular embodiment thereof, those skilled in the art will be able to make various modifications to the described embodiment of the invention without departing from the true spirit and scope thereof. It is intended that all devices and methods that are equivalent to those described herein in that they produce substantially the same function in substantially the same way to produce substantially the same result are within the scope of the invention. For example, the apparatus could be modified to place liquid fertilizer or other chemical treatment substance in the path of the high pressure air so that the liquid fertilizer or chemical treatment material is injected in the cracks and crevices in the loosened soil when the air valve is re-opened. The subsequently injected pressurized water could then dilute and disperse the injected liquid fertilizer or chemical treatment material. The water injected into the crevices might be mixed with suitable chemical substances before being injected from the bottom of the conduit into the ground.

What is claimed is:

1. A method of treating of the roots of a plant, the method comprising the steps of:
   (a) providing a root treatment apparatus including a first tube and a second tube both attached in fixed relationship to a ground plate and extending downward from the ground plate, and also including a chamber located above the ground plate in open communication with the first tube;
   (b) pre-drilling a hole in soil near the roots of the plant;
   (c) inserting the first and second tubes into the hole and lowering the root treatment apparatus so that a bottom surface of the ground plate rests on the soil around the hole; (d) supporting the weight of an operator by means of the ground plate so that the bottom surface of the ground plate produces a seal over the top of the hole;
   (e) forcing a quantity of compressed air through the chamber and the first tube into the hole, the quantity and pressure of the compressed air being sufficiently high to build up the pressure of air in the hole to a level that causes the ground plate and the weight of the operator to be lifted if the soil in which the hole is drilled is tightly packed, breaking the seal produced between the top of the hole and the surface of the soil by the ground plate;
   (f) allowing some of the compressed air in the pre-drilled hole to escape between the bottom of the ground plate and the soil around the hole and allowing the root treatment apparatus and the weight of the operator supported thereby to fall, causing the bottom surface of the ground plate to rest on the soil around the hole and reseal the hole;
   (g) repeating steps (e) and (f) to cause repetitive surging in the pressure of compressed air in the pre-drilled hole until the soil in which the hole is drilled is loosened, the compressed air producing voids and cracks in that soil.

2. The method of claim 1 including introducing fertilizer or chemical treatment matter into the path of the compressed air through the first tube and thereby forcing the fertilizer or chemical treatment material through the first tube into the hole and into the voids and cracks.

3. The method of claim 2 including providing a reservoir above the chamber, introducing the fertilizer or chemical treatment material into the reservoir, and after steps (f) and (g) have been repeated often enough to loosen the soil, turning off a supply of the compressed air, releasing pressure from the chamber by momentarily opening a valve connected in communication with the chamber, moving the fertilizer or chemical treatment matter from the reservoir into the chamber, turning the supply of compressed air back on, and repeating steps (e) and (f) to force the compressed air and the fertilizer or chemical treatment material into the voids and cracks.

4. The method of claim 3 including forcing a quantity of water or treatment liquid through the second tube to inject it into the voids and cracks and dissolving the fertilizer or chemical treatment material therein and carrying it to the roots of the plant.

* * * * *